Sept. 23, 1958 W. C. JOHNSON 2,853,104
METHOD OF MANUFACTURING GRID ELECTRODES
Filed Feb. 26, 1954 2 Sheets-Sheet 1

WITNESSES
Edwin E. Bassler
Charles F. Renz

INVENTOR
Warren C. Johnson
BY
F. E. Browder
ATTORNEY

Sept. 23, 1958 W. C. JOHNSON 2,853,104
METHOD OF MANUFACTURING GRID ELECTRODES
Filed Feb. 26, 1954 2 Sheets-Sheet 2

United States Patent Office 2,853,104
Patented Sept. 23, 1958

2,853,104

METHOD OF MANUFACTURING GRID ELECTRODES

Warren C. Johnson, Bath, N. Y., assignor to Westinghouse Electric Corporation, East Pittsburgh, Pa., a corporation of Pennsylvania Application February 26, 1954, Serial No. 412,765

4 Claims. (Cl. 140—71.5)

This invention relates to methods of manufacturing grid electrodes, and more particularly to those grid electrodes for use in electric discharge devices.

It is an object of my invention to provide an improved method of manufacturing of grid electrodes for electric discharge devices.

In ultra high frequency electric discharge devices, the distance or spacing between the grid electrode lateral wires and the cathode surface must be considerably less than in lower frequency devices. If this spacing between the cathode and grid is not accurately controlled, a great difference in performance in individual tubes of similar design will be obtained by mass production methods so that a uniform product is almost impossible.

In the prior art, the ordinary type grid consisting of two wire support rods and fine lateral wires wound around the support rods has been found to have many undesirable characteristics at ultra high frequencies. In general, the controllable tolerance between the two sides of the grid is about ±.001 inch with ±.0005 inch in some cases. Since the desired spacing between the grid sides and the cathode in such tubes is about .002 inch or less, a ±.0005 inch would result in a possible 25% shift in spacing. The transconductance of this type of device in general varies as a function of the second power of the spacing between the grid sides and the cathode and, therefore, the spacing is of an extremely critical nature.

A second factor adding to the difficulty in a well designed tube using ordinary type grids results from the usual necessity of increasing the turns per inch of the grid laterals on the side support rods. Such increase of turns per inch makes it necessary to reduce the size of the lateral wire. Thus the laterals of the grid, in general, become weaker so that uniform grid dimensions are less likely to occur.

One solution to the problem has been the utilization of a spring positioned on both ends of the grid so as to substantially hold the grid support rods apart and place the lateral wires under tension. This results in a uniform grid, but has some undesirable properties in that the support structure is unnecessarily large which increases the tube capacitance at ultra high frequencies. Also, the structure is not suitable in the construction of single face grids where only one side of the grid is utilized. It is highly desirable in some ultra high frequency tubes that the single face grid be used. First, because the tube can then be designed for better isolation of input and output circuits; secondly, because such tubes can be designed to couple better to the circuits; and thirdly, because tube designs can often be made in which more accurate spacings are achieved.

A possible solution to the problem of the support of the single side grids has been the utilization of a frame type support structure with the grid laterals wound about the frame. The wound frame is then coated in spots with silver or gold paste and the assembly is then heated in a hydrogen furnace or by some other method to melt the gold or silver so that the laterals are soldered to the frame. After cooling, the laterals may be removed from one side of the frame by cutting or burning.

The main disadvantage of the above described frame type single side grid is the high cost of manufacture of the individual grids. A method of mass production has been suggested to reduce the cost of manufacture by utilizing a continuous strip of individual frames and mount them on a drum member and then wind the lateral wires about the drum. This method limits the speed of production to rates less economical than those obtained when making standard grids by commercial methods.

Accordingly, it is an object of my invention to provide an improved method of high speed production of improved grid electrodes.

It is another object to provide a method of manufacture of grid electrodes that may be accomplished on modified conventional high speed production equipment.

It is another object to provide a method of manufacture that provides grid electrodes having uniform spacing between laterals and lying within one plane.

It is another object to provide a method of manufacture of grid electrodes that will permit the winding of the lateral wires on the frame without the necessity of deforming the grid after winding.

These and other objects are affected by my invention as will be apparent from the following description taken in accordance with the accompanying drawings through which like reference characters indicate like parts, and in which.

Figure 1:
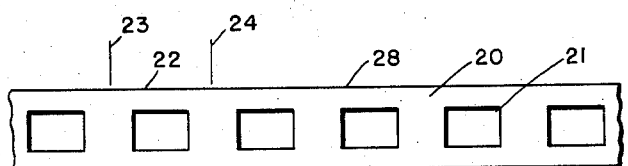
Figure 1 shows a plan view of a portion of a continuous strip or ribbon to be utilized as the frame structure of a plurality of grid electrodes.
Figure 6:
Fig. 6 shows a side view of the completed individual grid as shown in Fig. 4.

Referring in detail to Fig. 1, a strip or ribbon 20 of a suitable grid frame material, such as molybdenum, tantalum or nickel, is provided of the suitable dimensions. It may be desirable that the edges 28 and 29 of the strip 20 be rounded. The strip 20 has a plurality of apertures 21 uniformly spaced therein. A few representative strips or frame structures that may be utilized are shown in Figs. 7, 8, 9, and 10. There is no limit to the form of the strips, and these grid strips are shown only for purposes of illustration. It will be noted that each of the strips shown in Figs. 1, 7, 8, 9, and 10, have the apertures placed so as to be spaced in a repetitive manner. It is intended that each section 22, as indicated by the section between the dotted lines 23 and 24, of the strips will be utilized as a separate individual grid frame structure. The strips may be made up into any desirable lengths and then spooled onto spools similar to those utilized in the present grid winding machines in which support wires are utilized. The methods of producing the strip or ribbon 20 and punching the holes or apertures 21 therein are well known in the art and are capable of cheap, high speed production.

In the method of manufacture, as described in this invention, a metal ribbon is punched or blanked to provide a plurality of uniformly spaced apertures or openings. The ribbon is then rotated about its longitudinal axis while also moved at the same time along its longitudinal axis while the lateral wire is wound about the longitudinal axis of the ribbon while held in a substantially stationary rotating position. The laterals are affixed to the edge of the ribbon by any suitable method. The wound grid may then be removed from the machine and the lateral on one side of the ribbon removed and the ribbon cut transversely to the longitudinal axis so as to form a plurality of individual frame type grids from the continuous strip.

Figure 2:
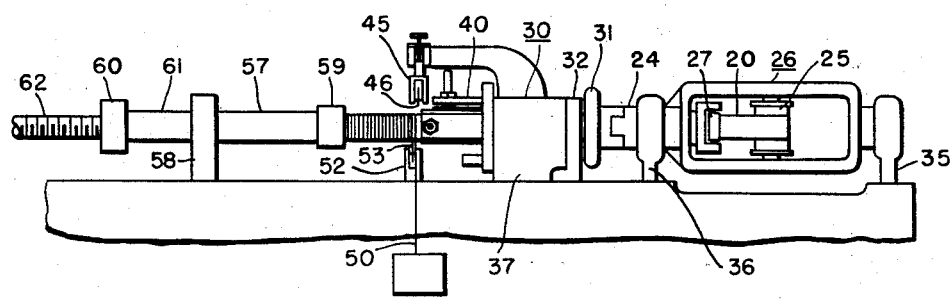
Fig. 2 shows diagrammatically apparatus for carrying out the method of my invention.

Referring in detail to Fig. 2, a machine suitable for manufacturing grids by the above method is shown. A spool 25 of the prepared metal strip or ribbon 20, as described in the preceding paragraph, is inserted into the spool holder or carriage structure 26. The ribbon 20 is then fed through a set of straightening rollers 27 which remove the curvature in the ribbon 20 caused by spooling the ribbon 20 onto the spool 25. The straightened ribbon 20, after passing through the straightening rollers 27 is fed through the hollow shaft portion 24 of the ribbon carriage 26 with suitable guides (not shown) to the winding head 30 of the machine. The winding head portion 30 of the machine is coupled to the ribbon carriage 26 with a flexible coupling 31 provided between the hollow portion 32 of the winding head 30 and hollow portion 24 of the ribbon carriage 26.

Elements 35, 36, and 37 are utilized to respectively support the rotating shafts of the ribbon carriage 26 and the winding head 30 of the machine. A special spring guide or chuck member 40 is mounted on the end of the hollow section 32 of the winding head 30 of the machine remote from the ribbon carriage 26. The ribbon 20, after passing through suitable guides (not shown) within the hollow portion 32 of the winding head 30 of the machine, passes through the aperture 41 in the chuck member 40 which is designed to rigidly hold the ribbon 20 with minimum lateral movement as the ribbon 20 passes longitudinally therethrough.

Figure 3:
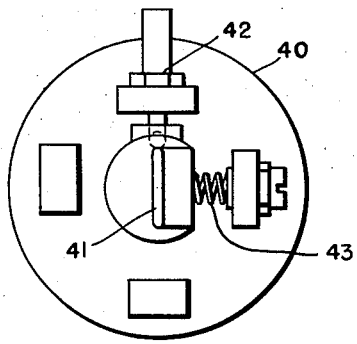
Fig. 3 shows an enlarged view of the guide or chuck assembly on the apparatus shown in Fig. 1.

In Fig. 3, there is shown a front view of the chuck member 40 showing that the ribbon 20 is prevented from lateral movement by the two spring tension members 42 and 43.

The ribbon 20, after passing through the chuck member 40, passes under a notching mechanism 45 which is mounted to the fixed member 37 of the winding head 30 of the machine. The notching mechanism 45, which is utilized in this embodiment, is represented by a sharp cutting wheel 46 mounted with its axis substantially parallel to the longitudinal axis of the ribbon 20. The notching wheel 46 is spaced from the longitudinal axis of the ribbon 20 so that it will nick or make a notch in the edges or narrow sides 28 and 29 of the ribbon 20.

A single strand of lateral wire 50 is fed in from the front of the machine in such a way that it falls into the nicks made by the notching mechanism 45. A peening member 52, represented by a suitably shaped wheel 53, is located on the opposite side of the lateral wire 50 with respect to the notching wheel 46 and acts to close the edges of the nicks made by the notching wheel 46 over the lateral wire 50 so as to affix or fasten the lateral wires 50 to the edges of the ribbon 20.

A longitudinally movable member 57 of the machine is positioned on the opposite side of the winding head 30 of the machine with respect to the ribbon carriage 26 and is held in position by the member 58 so as to be rotatable about its longitudinal axis which is substantially in alignment with the longitudinal axis of the ribbon 20. A clamping member 59 is provided at one end of the shaft 61 of the member 57 to which the end of the ribbon 20 is affixed and clamped thereto. A split thread guide 60 is provided on the opposite end of the shaft 61 of the member 57 and a fixed threaded rod 62 is threaded into the split thread guide 60. The three machine units, the winding head 30, the ribbon carriage 26 and the member 57 are driven by a common gear system (not shown) so as to rotate at a high rate of speed substantially about the longitudinal axis of the ribbon 20. Since the split thread guide 60 is prevented from rotating while the shaft 61 and clamping member 59 are permitted to rotate, the threaded rod 62 will gradually screw into the split thread guide 60. Since the member 57 may move along its longitudinal axis, it will move to the left and thus the ribbon 20 will be drawn along its longitudinal axis to the left, while being rotated about its longitudinal axis. The threading on the rod 62 thus determines the turns per inch of the grid lateral wires 50 on the grid frame. Also, as the machine rotates, the ribbon 20 is notched by the notching mechanism 45, the lateral wire 50 wrapped into the nicks and then peened by the peening mechanism 52.

Figure 4:
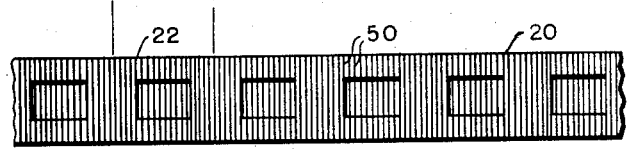
Fig. 4 shows a plan view of a portion of a continuous strip grid structure after winding of the frame on the machine shown in Fig. 2.
Figure 5:
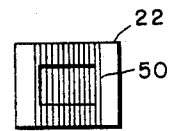
Fig. 5 shows a plan view of a complete individual grid as obtained from the wound strip shown in Fig. 4.
Figure 7:
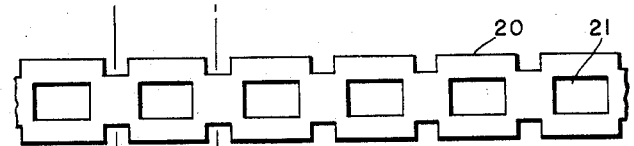
Fig. 7 shows a plan view of a portion of a modified strip to be utilized as the frame structure of a plurality of grid electrodes.
Figure 11:
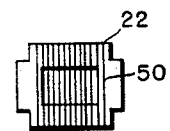
Fig. 11 shows a plan view of a completed grid from the grid frame structure shown in Fig. 7.
Figure 8:
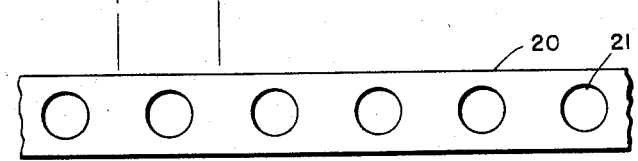
Fig. 8 shows a plan view of another modified strip to be utilized as the frame structure of a plurality of grid electrodes.
Figure 12:
Fig. 12 shows a plan view of a completed grid from the grid frame structure shown in Fig. 8.
Figure 9:
Fig. 9 shows a plan view of another portion of another modified strip to be utilized as the frame structure of a plurality of grid electrodes.
Figure 13:
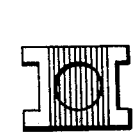
Fig. 13 shows a plan view of a completed grid from the grid frame structure shown in Fig. 9.
Figure 10:
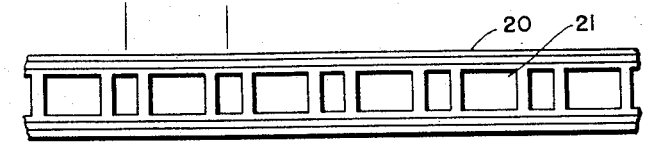
Fig. 10 shows a plan view of another portion of another modified strip to be utilized as the frame structure of a plurality of grid electrodes.
Figure 14:
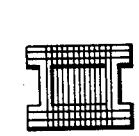
Fig. 14 shows a plan view of a completed grid from the grid frame structure shown in Fig. 10.

The position of the peening mechanism 52 may be periodically changed by a system of cams so that certain sections of the strip 20 are not peened. In this manner, after cutting the individual grids out of the wound grid strip, the unpeened laterals may be easily removed to provide suitable electrical connections and also so that the unpeened section of the grid frame may be utilized as support legs for the grid when attached or inserted into a mica spacer of an electric discharge device. It is also possible to alter the pitch of the threads of the rod 60 between individual grids to conserve wire. The wound strip 20, shown in Fig. 4, comprising a plurality of individual grid sections 22 may now be removed from the machine, and the laterals 50 on one side of the grid frame may be burned or cut in a suitable manner and the wound strip 20 cut at desired points so as to form the individual grid sections 22, as shown in Figs. 5, 6, 11, 12, 13, and 14.

Figure 15:
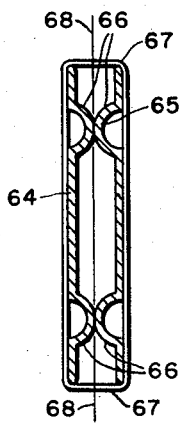
Fig. 15 shows a side view of two frame strips for utilization in the machine shown in Fig. 2 for the winding of two grids simultaneously.

It may be desirable in order to improve the quality of the final production, that the notched and peened grid lateral may be gold or silver soldered so as to improve the bond between the lateral wires and the frame. Referring in detail to Fig. 15, it is also possible to feed two strips 64 and 65 into the machine side by side. This would require the utilization of two spools within the spool carriage, and the strips 64 and 65 would require embossments 66 on the face of the strips 64 and 65, such as shown in Fig. 15. This embossment will space the strips a short distance apart, as shown in Fig. 15. In this manner, two strips 64 and 65 may be wound so as to make two single faced grids at the same time. The short pieces of lateral wire 67 holding the two strips 64 and 65 together will be split or burned at the points 68 by any suitable high speed method in order to split the two single face grids. This method increases the speed of production and eliminates the need for cutting or burning the laterals from one side of the frame.

I claim as my invention:

1. The method of manufacturing grid electrodes for electric discharge devices comprising rotating a plurality of strips stamped with a repetitive series of openings about their longitudinal axis while simultaneously moving said strips along their longitudinal axis, winding a wire around said strips in successive separated turns transversely to their longitudinal axes affixing each turn of said wire to the edges of said strips, and cutting said strips transversely to their longitudinal axes at a point between successive openings so as to form individual single faced frame grid electrodes.

2. The method of manufacturing grid electrodes for electric discharge devices comprising stamping a ribbon of metal with a plurality of uniformly spaced apertures, rotating said ribbon of metal about its longitudinal axis while simultaneously moving it along its longitudinal axis, winding a wire around said ribbon transversely to its longitudinal axis, affixing turns of said wire extending over said openings to the edges of said ribbon, removing said turns of said wire extending over said openings on one side of said ribbon and cutting said ribbon transversely to its longitudinal axis substantially at the midpoint between said apertures so as to provide individual grid electrodes.

3. The method of manufacturing grid electrodes for electric discharge devices comprising rotating a ribbon of metal with a plurality of uniformly spaced openings about its longitudinal axis while simultaneously moving it along its longitudinal axis so as to wind a wire about said ribbon of uniform spacing, notching and peening said ribbon on the edges thereof so as to affix said wires to said frame, removing substantially all of said wires on one side of said ribbon and cutting said ribbon transversely to its longitudinal axis between said openings to provide individual grid electrodes.

4. The method of manufacturing single faced grid electrodes to form a part of an electric discharge device characterized in that the supporting structure of said grid electrode is a rectangular apertured member which comprises rotating a ribbon of metal stamped with a plurality of uniformly spaced rectangular apertures, about the longitudinal axis of said ribbon, winding a lateral wire about said ribbon in a plane substantially perpendicular to said longitudinal axis of said ribbon while moving said ribbon along its longitudinal axis, affixing each turn of said winding to the edge of said ribbon by notching and peening and then soldering, removing the lateral wire on one side of said ribbon and cutting said ribbon transversely at substantially the mid-point between said apertures so as to provide a plurality of single faced frame grids.

References Cited in the file of this patent

UNITED STATES PATENTS

| | | |
|---|---|---|
| 1,978,108 | Howald | Oct. 23, 1934 |
| 2,181,288 | Washburn | Nov. 28, 1939 |
| 2,188,906 | Lackey | Feb. 6, 1940 |
| 2,610,387 | Borland | Sept. 16, 1952 |

While I have shown my invention in several forms, it will be obvious to those skilled in the art that it is not so limited, but is susceptible of various changes and other modifications without departing from the spirit and scope thereof.